(12) United States Patent
Lobo Morales et al.

(10) Patent No.: US 9,284,725 B2
(45) Date of Patent: Mar. 15, 2016

(54) STABLE COMPOSITIONS FOR USE AS BUILDING AND CONSTRUCTION MATERIALS

(76) Inventors: Rodrigo Lobo Morales, Monterrey (MX); Patricio Miguel O'Farrill Gonzalez, Monterrey (MX); Daniel Davila Barrientos, Monterrey (MX)

(*) Notice: Subject to any disclaimer, the term of this patent is extended or adjusted under 35 U.S.C. 154(b) by 0 days.

(21) Appl. No.: 13/816,475

(22) PCT Filed: Aug. 5, 2011

(86) PCT No.: PCT/MX2011/000097
§ 371 (c)(1),
(2), (4) Date: May 24, 2013

(87) PCT Pub. No.: WO2012/021052
PCT Pub. Date: Feb. 16, 2012

(65) Prior Publication Data
US 2013/0256579 A1    Oct. 3, 2013

(30) Foreign Application Priority Data

Aug. 9, 2010 (MX) .................... MX/a/2010/008736

(51) Int. Cl.
*C04B 28/16* (2006.01)
*E04B 1/78* (2006.01)

(52) U.S. Cl.
CPC .. *E04B 1/78* (2013.01); *C04B 28/16* (2013.01)

(58) Field of Classification Search
CPC .......... C04B 7/02; C04B 14/06; C04B 14/16; C04B 14/185; C04B 14/28; C04B 16/08; C04B 22/147; C04B 22/148; C04B 24/383; C04B 28/16; C04B 28/165; C04B 38/00; C04B 2103/10; C04B 2103/44

USPC ................................. 106/677, 680, 775, 776
See application file for complete search history.

(56) References Cited

U.S. PATENT DOCUMENTS

| 5,522,928 | A  | * | 6/1996 | Koslowski et al. | ........... 106/775 |
| 2007/0151483 | A1 | * | 7/2007 | Kato et al. | ..................... 106/638 |
| 2011/0139036 | A1 | * | 6/2011 | Lobo Morales et al. | ...... 106/698 |

FOREIGN PATENT DOCUMENTS

| CN | 101591160 A |   | 2/2009 |
| JP | 57156354 A |   | 9/1982 |
| JP | 7-33503 A | * | 2/1995 |
| KR | 100782044 B1 |   | 4/2007 |
| WO | WO2009/123431 A2 | * | 10/2009 |
| WO | WO 2010/033009 A1 |   | 3/2010 |

OTHER PUBLICATIONS

PCT application PCT/MX2011/000097; filing date Feb. 20, 2012; Davila O'Farril Technology SA DE CV; international search report issued Mar. 1, 2012.

* cited by examiner

*Primary Examiner* — Anthony J Green
(74) *Attorney, Agent, or Firm* — Thorpe North & Western, LLP

(57) ABSTRACT

The present invention relates to a foamed or non-foamed stable composition for use as a building material, for example as coverings, for plastering and insulating walls, floor slabs and ceilings. Such compositions can also be used for producing insulating structural elements, casting light and insulating ferro-cement structural systems, insulating piping, ducts, filling spaces (i.e. as fillers), stabilizing floors and producing cements floors, or for other uses in the constructions industry. One exemplary composition comprises the following components: 30 to 90% anhydrite, 0 to 40% Portland cement, 0 to 70% light and/or heavy fillers, 1 to 10% activator additives, 1 to 20% setting and strength regulator additives and 1 to 12% thickening additives.

11 Claims, No Drawings

STABLE COMPOSITIONS FOR USE AS BUILDING AND CONSTRUCTION MATERIALS

FIELD OF THE INVENTION

The present invention relates to foamed or non-foamed stable compositions. Such compositions typically include a base of anhydrite, a Portland cement, light and/or heavy fillers, activator additives, regulator additives and thickening additives. Such compositions may be used in a number of applications for example as coverings, and for plastering and insulating walls, floor slabs and ceilings. Such compositions may also be used for producing insulating structural elements, casting light and insulating ferro-cement structural systems, insulating piping, ducts, filling spaces (i.e. as fillers), stabilizing floors and producing cement floors, and other applications in the construction industry.

BACKGROUND OF THE INVENTION

The present invention relates to foamed or non-foamed stable compositions. Such compositions may include a base of anhydrite, a Portland cement, light and/or heavy fillers, activator additives, regulator additives and thickening additives. Such compositions may be used in a number of applications for example as coverings, and for plastering and insulating walls, floor slabs and ceilings. Such compositions may also be used for producing insulating structural elements, casting light and insulating ferro-cement structural systems, insulating piping, ducts, filling spaces (i.e. as fillers), stabilizing floors and producing cement floors, and for other applications in the constructions industry. Surprisingly, it has been discovered that increasing a quantity of anhydrite in building compositions increases the range of products that can be fabricated with such compositions such as blocks, bricks, mortars, concrete, beams, panels, etc. Each one of these products will be manufactured to fulfill the characteristics that the construction norms demand like resistant elastic modulus, rupture modulus, water absorption, accelerated aging tests and dimensional stability. The modification or increment of fillers in the compositions of the present invention gives to the products a bigger range of densities and this range is reflected in temperature isolation. The modification of the amount of additives increases the gain of resistant and hardening in time. The use of polyol foam in the composition as a light filler results in a better uniformity of the final products and avoids the use of light fillers that are not renewable.

There are a number of patents that mention the use of anhydrite in mortar compositions. However, these differ from the present composition in components and characteristics.

A composition mentioned in the application CN101591160 A, refers to a composition based in Portland cement, alumina, anhydrite, polymeric powder, water, thickening agent, setting time accelerator and a mix of minerals.

The application KR100782044 B1, refers to a mortar composition and method for its elaboration. The composition consists of fillers, mixture agents, Portland cement and water wherein the method of preparation consists of mixing the components of the composition.

In the state of the art known compositions based on anhydrite have been developed by the same inventors, but are different from the composition of the present invention as follows:

The document WO 2010033009 relates to a thick or gel-like composition of cellular mortar that comprises 0.01 to 5% silicon polymer, 0.01 to 4% cellulose polymer, 5 to 50% water, 0 to 40% Portland cement, 0 to 50% anhydrite, 1 to 40% light and/or heavy fillers, 0.01 to 5% additives and 10 to 40% polyol foam. This composition is different from those described herein. For example, the silicon and cellulose additives are different in their proportions as compared to the compositions of the present invention. Additionally, the anhydrite varies from 30 to 90%. The properties provided by these differences achieve a major increase in range of products that can be fabricated because they fulfill better the specifications of the construction norms for more products. The light and/or heavy fillers go in the composition from 1 to 70% and give a major range of density and so a bigger spectrum for thermo isolation. In the case of additives the proportion is different because they go from 0.01 to 10% increasing the amount and duration of resistance and hardness. The foam varies from 1 to 20% and gives stability and uniformity to the final products and avoids the use of light fillers which are typically not uniform because they came from mines and have different densities.

The document WO2009123431 relates to a composition of a light structural mortar that comprises 80 to 95% synthetic anhydrite type II, 2 to 6% calcium hydroxide, 4 to 20% light fillers and 0.05 to 10% soluble additives, but this is different from the present composition because the synthetic anhydrite varies of 30 to 90% increasing the number of products that can be manufactured with this composition. In other words, a greater range of compliant construction products can be produced. In one embodiment, the light and/or heavy fillers used in the present compositions vary from 1 to 70%. This aids in conferring a major range of densities which in turn contributes to a major increase in thermo isolation spectrum. Furthermore the composition of the present invention can include a polyol foam that varies from 1 to 20%, which may result in greater stability and uniformity of the final product without the need for quality non-uniform fillers.

We consider that the documents mentioned, do not affect the novelty or the inventive step of the present composition because the components and the quantities are different.

There are several compositions that utilize cement but they are different from the compositions of the present invention. One difference is the use of anhydrite as a cement substitute. Anhydrite is a byproduct of the chemical industry. The anhydrite may be used as a Portland cement substitute. This implies that the compositions and the products made out of it are ecologically friendly because its production does not require burning fuel. This means that for each ton of Portland cement substituted with anhydrite avoids the pollution and contamination of the environment with 750 carbon units. This is sustainable because the use of non-renewable materials is not required and also considered green because of the use of light fillers in the final products. Low density products have the advantage of saving energy due to their thermo isolation properties, also an advantage for the construction of social housing and service spaces, and also the advantage of saving money and avoiding pollution in the freight required to transport the products.

DESCRIPTION OF THE INVENTION

The present invention relates to foamed or non-foamed stable compositions. Such compositions may include a base of anhydrite, a Portland cement, light and/or heavy fillers, activator additives, regulator additives and thickening additives. Such compositions may be used in a number of applications for example as coverings, and for plastering and insulating walls, floor slabs and ceilings. Such compositions can additionally be used for producing insulating structural elements, casting light and insulating ferro-cement structural systems, insulating piping, ducts, filling spaces (i.e. as fillers), stabilizing floors and producing cements floors, and for other applications for the construction industry. Surprisingly the bigger quantity of anhydrite in the composition increases the range of products that can be fabricated, which comply with the norms and characteristics that the construction industry requires. The bigger range in the proportion of light fillers gives a major expansion in spectrum of thermo isolation of such products. The different additives used in the compositions can be balanced to gain resistance strength and hardness for the finished products. The inclusion of a polyol foam results in greater stability and uniformity of the final product without the need for quality non-uniform fillers.

Cellular mortars that include a base of polyol alkaline polypeptides in aqueous concentrations sufficient to be surface active, were introduced in the market a few years ago. They are prepared by mixing a small amount concentrated with water and with pumped air to create bubbles. As used in the present compositions, the amount of foam mixed with water will give different densities and size of the bubbles in the foam. This foam is used as a light filler, for example a mixture of this can be made by one liter of polyol and forty nine liters of water, forming to a cubic meter of foam. The foam bubbles burst during resistance in no more than one hour, so in this way mixing the foam with cements will have lower initial setting times, such as an hour, or from 30 to 50 minutes. A space is formed where it is occluded in the cement paste or material, and the final, mixture looks like a cellular mortar or concrete.

The most common uses are for covering ceilings, insulating piping, thermo isolation of the products, as base of some sections of asphalt or concrete roads, and to fill spaces in constructions. As liquid consistency is very similar to a watery sludge, this consistency has limitations, such as low resistance and in the case of heavier make the use of heavy filler such as calcium carbonate sands. Such consistency causes these to precipitate, which in turn causes the products obtained are not uniform in density and not for coating can be filled by lack of body.

The production of mortar and concrete base Portland cement and sand for construction, can be used specifically for covering, walls, floor slabs and ceilings, in order to beautify and protect homes and service spaces. When this has been carried out for many years, environmental damage, such as pollution and visual spaces, is evidenced by exploitation of the calcareous sands and hills forming.

Actually the preoccupation for a clean environment and the optimization of natural resources, norms and laws have been created to contribute to save energy and to regulate substances that pollute the underground water and the environment.

The new methods for energy savings include first the thermo isolation of the constructions by the use of expanded polystyrene, polyethylene and polyurethane panels, fiber glass and mineral wool as well as expanded polyurethane and other light materials. Such materials must be protected because of their low durability to the natural elements.

Even that they have great performance as thermo isolators, its low durability and its need of protection as well as specialized applicators to install it make these materials very expensive for popular homes and constructions. This is why only some developed countries have regulations and the isolation must be sufficient to accomplish the regulations created to Protect the environment, for example, saving energy by constructing comfortable homes protected against cool and hot weather Most third world countries still use heavy mortars and concrete based in cement sand, the stuccos of cement and gravel and of the gypsum to build and cover with mortars that weighs 2,400 kg by cubic meter.

In the case of the use of marvel, calcium carbonate sand and gravel the extraction, the mill, and transport from the mines of this materials requires high cost of energy and polluting to create products without thermo isolating advantages.

The most used way to fabricate lightweight materials and construction products is to include in Portland cement mixes and other cements, light fillers, although this implies in most cases adding more cement to meet the regulations for these products.

For the solution of this problem of contamination and provide alternative materials, the present invention develops formulations and compositions with a base of anhydrite that is the byproduct, coproduct or waste of the production of fluorhidric acid, and which substitutes all or part of the grey or white Portland cement in the compositions to avoid the contamination by the exploitation of raw materials and spend of energy in the reactors for its production.

By incorporating into the present compositions the use of light fillers like expanded perlite and/or pumice and/or pumite, and/or tepezil, and/or polystyrene, polyurethane and/or concentrate polyol foam, alternative materials for the construction industry with good performance are produced. One issue is that anhydrite production is limited to meet market needs, because they do not operate in all regions of hydrofluoric acid plants and light filler are expensive.

The mortars based in cement and lime, made with light fillers as perlite, pumice and/or tepezil are in the market in the form of blocks, but the mortars with this compositions used to cover walls are not in high demand because of the great amount of cement needed to get the resistance that demand the construction industry for this use, have much water absorption and low resistance to abrasion presence of plastic fissures or cracks and need a second layer, which is expensive in time and hand labor.

The mortars base cement that are mix with polyol foam and sand, called "cellular concrete" have good resistance but demand a lot of cement. It has low density and its easy to apply but only poured because of the fluidity of the material in use is to cover roofs or cemented base for concrete streets or sidewalks because they have more resistance than a compacted soil. But because of its fluidity in products that have more than 30 cm high the sand that gives part of the resistance goes down by gravity resulting in a construction unit with high densities in the bottom and low in the upper parts so they are not recommended for walls or mold construction systems or construction units like blocks or panels.

All this problems are solved using the composition of the present invention.

The composition of the present invention is foamed when includes the polyol foam from 1 to 20%, and not when the polyol foam is 0% in the final composition.

The components of the present invention comprises; anhydrite, Portland cement, light and/or heavy fillers, activator additives, regulator additives and thickening additives.

In one embodiment the composition of the present invention comprises 30 to 90% of anhydrite, 0 to 40% Portland cement, 0 to 70% light and/or heavy fillers, 1 to 10% activator additives, 1 to 20% setting and strength regulator additives and 1 to 12% thickening additives.

The indicated percentages are by weight.

In the other preferred embodiment the composition of the present invention comprises 30 to 90% anhydrite, preferably 51 to 90% anhydrite, more preferably 51 to 79% anhydrite; 0 to 40% Portland cement; 0 to 70% light and/or heavy fillers, preferably 41 to 70% light and/or heavy fillers, more preferably 21 to 70% light and/or heavy fillers, and even more preferentially 1 to 20% of polyol foam as light filler; 1 to 10% activator additives; 1 to 20% setting regulator and resistance additives, and 1 to 12% thickening additives.

The light fillers are selected from expanded perlite, pumice or pumite, Tepezil, Jal, polystyrene, polyurethane, polyethylene polystyrene polyurethane, polyol foam, aluminum dioxide sand and/or mixtures of theses and the heavy fillers are selected of silica sands or calcium carbonate sands and/or in combination of these, provide the strength of the composition.

The activator additives are selected from soluble salts and hydroxides highly soluble, preferably potassium sulfate, aluminum sulfate, calcium hydroxide or mixtures thereof.

The setting regulator and resistance additives are selected of different types of Portland cement type I II or III, grey, white, preferably type I, as setting times and resistance desired.

The thickening additives to promote thickness are selected of acrylic resins, silicon polymer and/or cellulose polymer or mixtures thereof. This allows the application of the composition in vertical surfaces in different thickness.

The cellulose polymers can be any type cellulose base but preferably vermocol and natrosol, as thickener.

The anhydrite and/or cement are selected as cement or conglomerate.

The cements are selected of Portland cement type I II or III, grey, white, as setting times and resistance desired.

The anhydrite is selected of synthetic anhydrite type II.

The activator additives are selected from sulfates or hydroxide for example potassium sulfate, aluminum sulfate, calcium hydroxide, all the additives must be of high solubility.

The polyol foam is selected of the polyol foam known in the art, preferably its selection of concentrates of active surface base polyols, alkaline polypeptides.

Furthermore the polyol foam, forms a bubble that endures 40 minutes without collapsing, allowing the cement to set or it harden in an approximate time from 20 to 30 minutes letting the mass cellular to form.

The polyol foam as light filler varies from 0 to 20%, preferably 1 to 20%, without the need for quality non-uniform fillers.

In one embodiment additional the composition of the present invention contains water in a proportion from 5 to 50% to allow dispersion of the components.

The components that form the composition of the present invention have the following characteristics:

a) Water like vehicle of dispersion and the activation of the conglomerate or cement.

b) The anhydrite and/or Portland cement has conglomerate or cement.

c) Silicon based polymer as waterproofing and cellulose based polymer as thickening additives of the composition.

d) The filler are selected from expanded perlite, pumice or pumite, Tepezil, Jal, polystyrene, polyurethane, polyethylene, polyol foam, aluminum dioxide sand and/or mixtures of theses and the heavy fillers are selected of silica sands or calcium carbonate sands and/or in combination of these, provide resistance and lightness and thermo isolation of the composition.

e) The polyol foam like light filler provides volume depending on the amount used, taking care not to lose the thick consistency allows the application of the composition in vertical surfaces and ceilings.

The compositions of the present invention provide a mortar with different characteristics in their consistency and body to be used for covering, plastering and insulating walls, floor slabs and ceilings, and also for producing insulating structural elements, casting light and insulating ferro-cement structural systems, insulating piping, ducts, filling spaces, stabilizing floors and producing cements floors, for the constructions industry, the composition of the present invention, has a consistent and manageable body, so the procedure to achieve this consistency is very important and takes into account 2 factors:

1) The mixing process used: that allow to preserve the volume of the polyol foam, mixing first the silicon polymer and the cellulose polymer with water, immediately adding the cement obtaining a watery mixture or slurry type for better mixing with the fillers and the second adding loads if required, this result gives a mixture of thicker consistency, incorporating the polyol foam to the end, which gives the mixture will maintain more fluidity but sufficient consistency to be applied in thicknesses of 5 mm up to two inches.

2) Its chemicals composition: anhydrite and/or Portland cement, light or heavy fillers, expanded perlite, pumice or pumite, Tepezil, Jal, polystyrene, polyurethane, polyethylene, polyol foam, aluminum dioxide sand and/or mixtures of theses and the heavy fillers are selected of silica sands or calcium carbonate sands and/or in combination of these, polyol foam with silicon polymer and cellulose polymer, also thickening additives.

The different light fillers can be combined searching for resistance and density characteristics and volumetric weight expected for mortar, as well as the amount of cement and polyol foam. The silicon polymer, provides waterproof and body to the mixture, which protects the breaking of the foam bubbles, this results in a 15 to 20% more volume than a mix without the polymers, the most important characteristics of this mortar cellular is the consistency of gel or body that is given by the celluloses polymer, combinations that are not achieved with known cellular mortars.

The consistency or body of this mixture allows incorporation of heavy fillers such as silica sands or calcium carbonate sands up to 30. If more resistance is required, as in the case of house mold castings, adding up to 40% of heavy fillers without the occurrence of precipitation or separation fillers, we recommended the use of a screw neoprene pump and down the hose filling below the bottom upwards.

The initial sitting time and finish setting time varies from 35 to 55 minutes and the resistance varies from 5 to 100 Kg/cm2 depending of the combination of the mixture.

The procedure to prepare a foamed or non-foamed stable composition, anhydrite base of the present invention comprises:

a) Mix at 15 to 50 revolution by minute in a mixer until its complete homogeneities during a time from 15 to 35 minutes at room temperature the components in the fallowing order: 5 to 50% in weight of water; 1 to 12% in weight of thickening additives; 0 to 40% in weight of cement; 30 to 90% in weight of anhydrite, preferably 51 to 90% in weight of anhydrite, more preferably 51 to 79% in weight of anhydrite; 0 to 70% light and/or heavy fillers, preferably 41 to 70% light and/or heavy fillers, more preferably 21 to 70% light and/or heavy fillers, and even more preferentially 0 to 20% of polyol foam as light filler; 1 to 10% activator additives and 1 to 20% in weight of setting regulator and resistance additives.

b) Apply or coating the foamed or non-foamed stable composition for covering walls, floor slabs and ceilings, and also for producing insulating structural elements, casting light and insulating ferro-cement structural systems, insulating piping, ducts, filling spaces, for the constructions industry.

The composition has a gelatin consistency and body avoiding the segregation of the components giving uniformity to the mortar and its easy application for different uses.

EXAMPLES

The following examples are intended to illustrate the invention, not restrict it, any variation by experts in the technique, being within the scope of the same.

Example 1

Mix to its complete homogeneity the components in the fallowing order in weight percent: 5 to 50% water, 1 to 12% thickening additives preferably 0.01 to 5% silicon polymer, 0.01 to 4 cellulose polymer, 0 to 40% cement, 0 to 50% anhydrite, 0 to 70% light and/or heavy fillers, preferably 41 to 70% light and/or heavy fillers, more preferably 21 to 70% light and/or heavy fillers, and even more preferentially 0 to 20% of polyol foam as light filler, 1 to 20% setting regulator and resistance additives, and 1 to 20% in weight of thickening additives, applied by means known in the art the composition of gel consistency and body to vertical walls, ceilings roofs, for producing structural elements in molds, insulating piping, ducts, filling spaces, covering or casting light and insulating ferro-cement or ferro-mortar structural systems, stabilizing floors and producing cements floors, insulating building elements of a swimming pool as a "cool deck" product.

Example 2

Aggregate to the mixer the following proportions in volume to its complete homogeneity.

0.5 parts of water 0.03 parts of additives (for anhydrite, potassium sulfate, aluminum sulfate or calcium hydroxide, cellulosic calcium stearate; for cement cellulosic calcium stearate)

0.02 parts of thickening additives preferably silicon base polymers 1 part of cement 2 parts of expanded perlite or mix of the light fillers mentioned previously depending on the desired characteristics, y 2 parts of polyol foam.

This composition achieves strikingly one consistency of gel and body.

The easy application may be accomplished with masonry's tools or use a mortar thrower diaphragm type, piston or screw in neoprene shirt air pomp and other type of mortar throwers, etc.

The mortar is used in the constructions industry for covering walls, floor slabs and ceilings, as stucco, mortar or plaster in thickness of 5 mm to 3 cm, for covering or casting ferrocement structural systems, insulating piping, ducts, filling spaces, with insulating characteristics, good hardness and resistance, for stabilizing floors and producing cements floors.

Example 3

Following the procedure of the present invention, to prepare a foamed composition that includes the mix of the fallowing ingredients: 30 to 90% anhydrite, preferably 51 to 90% anhydrite, more preferably 51 to 79% anhydrite; 0 to 40% Portland cement, 0 to 70% light and/or heavy fillers, preferably 41 to 70% light and/or heavy fillers, more preferably 21 to 70% light and/or heavy fillers, and even more preferentially 0 to 20% of polyol foam as light filler; 1 to 10% activator additives, 1 to 20% setting regulator and resistance additives, and 1 to 12% thickening additives. All percentages are by weight.

For covering and insulating walls, floor slabs and ceilings, and also for producing insulating structural elements, casting light and insulating ferro-cement structural systems, insulating piping, ducts, filling spaces, stabilizing floors and producing cements floors, for the constructions industry.

To fabricate products such as blocks, bricks, mortars, concrete, beams, panels, insulating building elements of a swimming pool as a "cool deck", etc.

Example 4

Following the procedure of the present invention, to prepare a non-foamed composition, ie does not include polyol foam as light filler, that includes the mix of the fallowing ingredients: 30 to 90% anhydrite, preferably 51 to 90% anhydrite, more preferably 51 to 79% anhydrite; 0 to 40% Portland cement, 0 to 70% light and/or heavy fillers, preferably 41 to 70% light and/or heavy fillers, more preferably 21 to 70% light and/or heavy fillers; 1 to 10% activator additives, 1 to 20% setting regulator and resistance additives, and 1 to 12% thickening additives. All percentages are by weight.

For covering and insulating walls, floor slabs and ceilings, and also for producing insulating structural elements, casting light and insulating ferro-cement structural systems, insulating piping, ducts, filling spaces, stabilizing floors and producing cements floors, for the constructions industry.

To fabricate products such as blocks, bricks, mortars, concrete, beams, panels, insulating building elements of a swimming pool as a "cool deck", etc.

What is claimed is:

1. A foamed or non-foamed stable composition for covering walls, floor slabs and ceilings, and for producing structural elements, casting ferro-cement structural systems, insulating piping, ducts, filling spaces, stabilizing floors and producing cements floors, for the constructions industry and thermal insulation which comprises the following components in percentage in weight, 30 to 90% anhydrite, a Portland cement in an amount of from 1 to 60%, 0 to 70% light and/or heavy fillers, 1 to 10% activator additives selected from the group consisting of potassium sulfate, aluminum sulfate, calcium hydroxide, and mixtures thereof, and 1 to 12% thickening additives selected from the group consisting of acrylic resins, silicon polymers and cellulose polymers, and mixtures thereof.

2. A foamed or non-foamed stable composition according to claim 1, wherein the composition comprises 51 to 90% in weight of anhydrite, Portland cement in an amount of from 1 to 60%, 41 to 70% light and/or heavy fillers, 1 to 10% activator additives, and 1 to 12% thickening additives.

3. A foamed or non-foamed stable composition according to claim 1, wherein the composition comprises 51 to 79% in weight of anhydrite, Portland cement in an amount of from 1 to 60%, 21 to 70% light and/or heavy fillers, 1 to 10% activator additives, and 1 to 12% in weight of thickening additives.

4. A foamed or non-foamed stable composition according to claim 1, wherein the light filler is from 1 to 20% in weight of a polyol foam.

5. A foamed or non-foamed stable composition according to claim 1, wherein the composition comprises 51 to 90% in weight of anhydrite, Portland cement in an amount of from 1 to 60%, 21 to 70% in weight light and/or heavy fillers, 1 to 10% activator additives, and 1 to 12% in weight of thickening additives.

6. A foamed or non-foamed stable composition according to claim 1, wherein the composition comprises 51 to 79% in weight of anhydrite, Portland cement in an amount of from 1 to 60%, 1 to 70% light and/or heavy fillers, 1 to 10% activator additives, and 1 to 12% in weight of thickening additives.

7. A foamed or non-foamed stable composition according to claim 1, wherein said composition additionally contains water in a proportion of 5 to 50%.

8. A foamed or non-foamed stable composition according to claim 1, wherein the light filler is selected from the group consisting of polystyrene, polyurethane, polyethylene, polyol foam, aluminum dioxide sand, and mixtures thereof and the heavy fillers are selected from the group consisting of silica sands or calcium carbonate sands, and combinations thereof.

9. A foamed or non-foamed stable composition according to claim 4, wherein the polyol foam forms a bubble that endures 40 minutes without collapsing, allowing the Portland cement to set or harden in an approximate time from 20 to 30 minutes.

10. A foamed or non-foamed stable composition according to claim 1, wherein the anhydrite is selected from the group consisting of synthetic anhydrite type II.

11. A procedure for preparing a composition as in claim 1 comprising:
 a) mixing at 15 to 50 revolution per minute in a mixer until homogenous during a time from 15 to 35 minutes at room temperature the components in the following order: 5 to 50% in weight of water; 1 to 12% in weight of thickening additives selected from the group consisting of acrylic resins, silicon polymers, cellulose polymers, and mixtures thereof; a Portland cement in an amount of from 1 to 60% in weight; 30 to 90% in weight of anhydrite, 30 to 70% light and/or heavy fillers, 1 to 10% activator additives selected from the group consisting of potassium sulfate, aluminum sulfate, calcium hydroxide, and mixtures thereof;
 b) applying or coating the foamed or non-foamed stable composition for covering walls, floor slabs and ceilings, and for producing insulating structural elements, casting light and insulating ferro-cement structural systems, insulating piping, ducts, filling spaces, stabilizing floors and producing cements floors, for the constructions industry;
 wherein the light filler is selected from the group consisting of polystyrene, polyurethane, polyethylene, polyol foam, aluminum dioxide sand, and mixtures thereof and the heavy fillers are selected from the group consisting of silica sands, calcium carbonate sands, and combinations thereof,
 wherein the light filler is from 1 to 20% in weight of a polyol foam, and
 wherein the composition has a consistency sufficient to allow inclusion of heavy fillers selected from the group consisting of silica sand or calcium carbonate sand in an amount of 30% to 40% in weight, without precipitation or segregation thereof, and wherein an initial setting time to final setting time is from 35 to 55 minutes and resistance is from 5 to 100 kilograms by square centimeter.

* * * * *